United States Patent [19]
Schor

[11] 3,744,001
[45] July 3, 1973

[54] FILTER ADAPTOR FOR PRINTED CIRCUIT BOARD CONNECTOR

[75] Inventor: Ferdinand William Schor, Goleta, Calif.

[73] Assignee: AMP Incorporated, Harrisburg, Pa.

[22] Filed: May 27, 1971

[21] Appl. No.: 147,560

[52] U.S. Cl. .... 339/14 R, 339/176 MP, 339/147 R, 333/79
[51] Int. Cl. .... H01r 3.06
[58] Field of Search .... 339/14 R, 14 P, 176 R, 339/176 M, 176 MF, 176 MP, 147 R, 147 P, 154 R, 154 A, 17 R, 17 L; 333/79, 84; 317/112

[56] References Cited

UNITED STATES PATENTS

| | | | |
|---|---|---|---|
| 3,413,594 | 11/1968 | Fernald et al. | 339/176 MP |
| 3,648,222 | 3/1972 | Cowmeadow | 339/14 R |
| 3,654,592 | 4/1972 | Primorac | 339/176 MA |
| 3,275,954 | 9/1966 | Coda et al. | 333/79 |
| 3,462,715 | 8/1969 | Schor | 333/79 |
| 3,597,711 | 8/1971 | Buckley | 333/79 |

*Primary Examiner*—Marvin A. Champion
*Assistant Examiner*—Robert A. Hafer
*Attorney*—William J. Keating, Ronald D. Grefe, Gerald K. Kita, Frederick W. Raring, Jay L. Seitchik, John R. Flanagan and Allan B. Osborne

[57] ABSTRACT

A filter adaptor capable of being quickly inserted between two adjacent leads feeding into a printed circuit (PC) board connector.

The adaptor comprises an insulating body having two spring contacts for insertion into the PC board connector, a low pass filter, and a contactor within said body for establishing contact between incoming leads and the filtered contacts.

8 Claims, 5 Drawing Figures

FILTER ADAPTOR FOR PRINTED CIRCUIT BOARD CONNECTOR

BACKGROUND OF THE INVENTION

The present invention relates to electrical connectors wherein one set of contact terminals are assembled to one connector member and complementary contact terminals are mounted in the mating adaptor member to provide two or more electrical circuits upon engagement of these members. More particularly, the invention relates to an adaptor member wherein one or more RF filter assemblies comprising capacitive inductive and/or lossy circuit elements are electrically connected to the contact terminals of the adaptor member so as to attenuate the undesired RF signals which would otherwise pass through the connector.

A PC board connector with flexible leads usually consists of an insulating housing having a double row of spring contacts designed to make electrical connection to a row of metallic tabs on one or both surfaces of a PC board. This PC board contains a portion of the electrical components of the equipment which are connected together usually by printed circuitry appearing on one or both sides of the board.

Connection to the remaining circuitry of the equipment is then made through the flexible leads attached to the PC board connector. Thus, the PC board can be easily removed for changes or repair by simply pulling the PC connector off and detaching the PC board from its mounting.

Where PC boards contain sources of high frequency interference such as oscillators, SCR rectifiers, pulse circuits or high voltage diodes, it is desired to keep this interference from propogating through the connector terminals and lead wires to other parts of the equipment. Such high frequency interference appearing on other parts of the equipment containing sensitive circuits could result in the malfunctioning of the entire system. One method of preventing the coupling of this undesired high frequency interference is to use low pass filters between the PC boards and the leads attached to the PC board connector. A logical location for such filters is adjacent to the PC board connector itself.

One of the obstacles to the use of filters in PC board connectors is that the equipment designer has no easy method of determining the effectiveness of such a filter. Need thus exists for a filter adaptor whereby the designer can quickly determine if RF filters in the PC board connector will serve a useful purpose. Such would eliminate the need for waiting for a special connector to be designed and built or to use substitute measures such as using boards with several layers of copper and insulating dielectric to provide large capacities between the printed circuit wiring and the ground plane.

Application Ser. No. 883,501 filed Dec. 8, 1969 discloses a low pass filter comprising a coating of barium titanate applied to a ferrite substrate and is of the general type contemplated for use in the present invention. An electrical connector using a similar filter composition is dislcosed in U. S. Pat. No. 3,447,104 issued to me.

SUMMARY OF THE INVENTION

Accordingly, it is an object of the present invention to provide an RF filter packaged so that it can be quickly inserted between a PC board connector and two or more lead wires leading into the connector.

It is a further object of the present invention to provide a means of installing a filter in a PC board wiring circuit without requiring additional soldering or wire crimping operations.

It is still a further object of the invention to provide a means to prevent interference picked up by the leads or transmitted through the leads from other components from entering the PC board via the connector.

It is a further related object of the present invention to provide means to prevent RF interference generated in the PC board from reaching the remaining components of the equipment.

Still another object of the present invention is to provide a filter adaptor which can be used for interim application.

Still one further object of the present invention is to provide an economic means of adding a small number of RF filters to a PC board connector so that no redesign of the connector or rewiring is required.

BRIEF DESCRIPTION OF THE DRAWINGS

FIG. 3 shows an enlarged view of the filter adaptor,

DESCRIPTION OF THE PREFERRED EMBODIMENT

Figure 1:
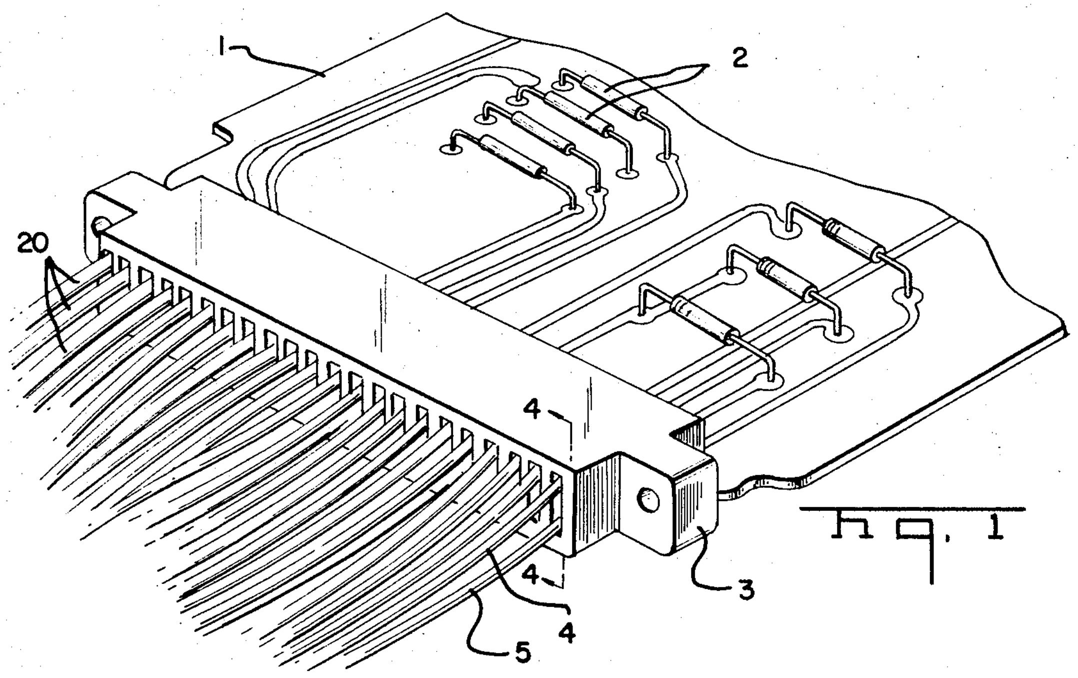
FIG. 1 shows a PC board with the PC board connector and leads attached.

FIG. 1 shows a typical assembly of a PC board 1 with components 2 which are mounted on a PC board connector 3. Connection to other parts of the equipment is made through leads 20 including leads 4 and 5.

Figure 2:
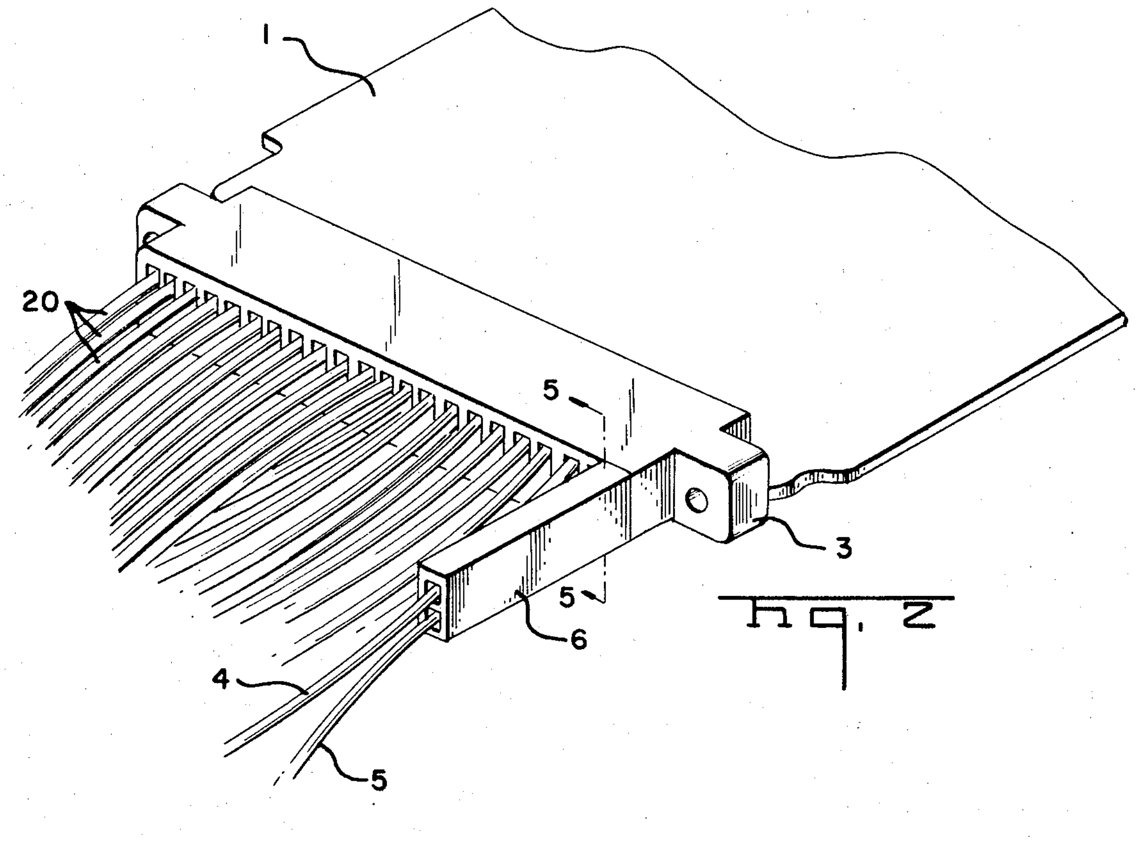
FIG. 2 shows a view of the PC board connector with the filter adaptor in place.
Figures 4, 5:
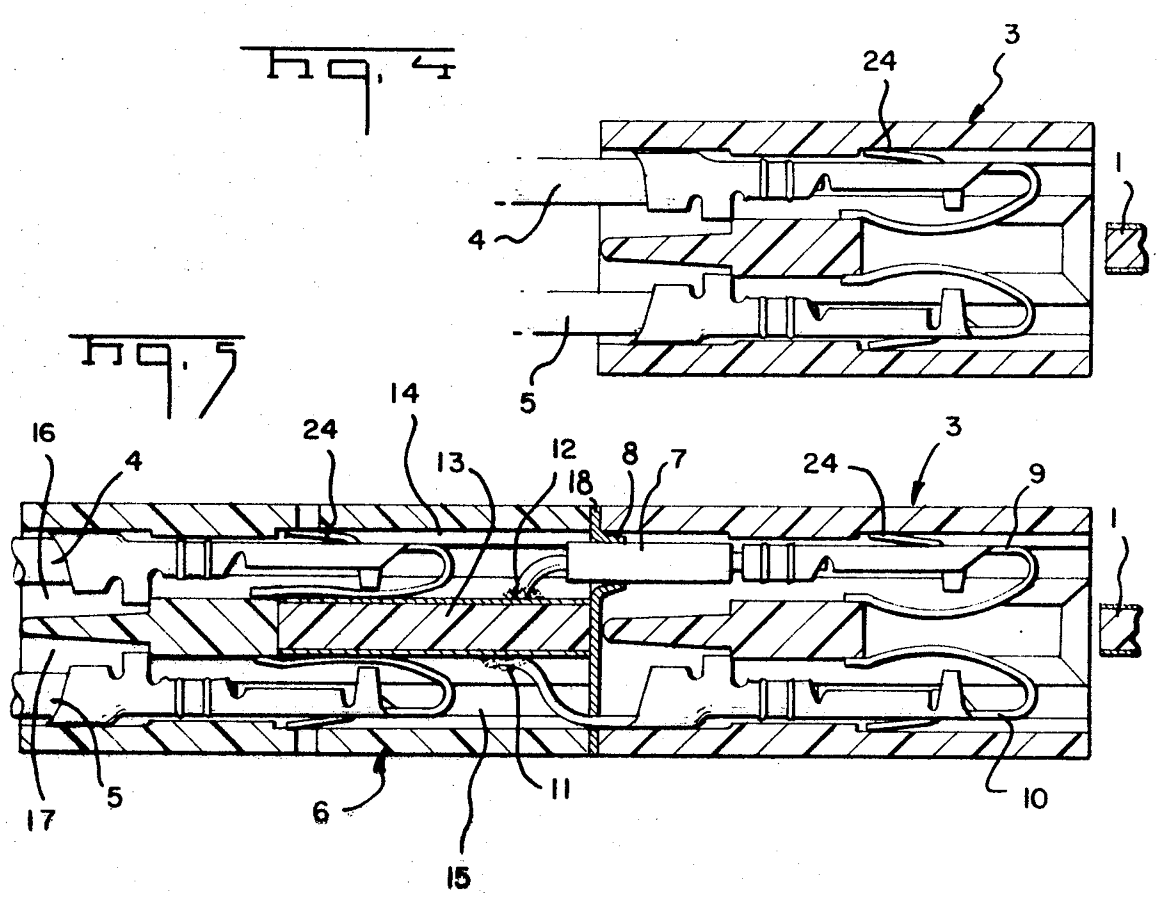
FIG. 4 is a view taken along the lines 4—4 of FIG. 1.
FIG. 5 is a view taken along the lines 5—5 of FIG. 1.
Figure 7:
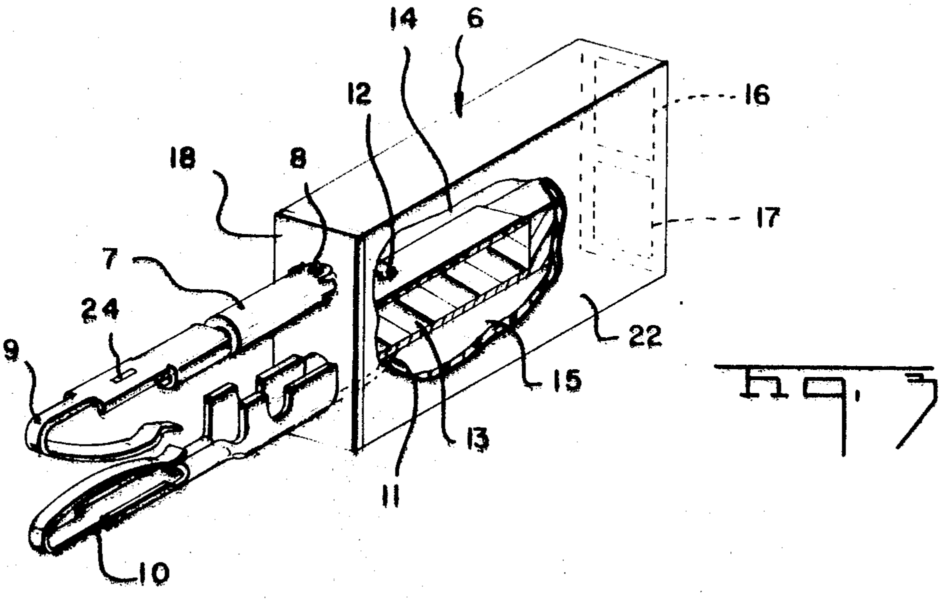

FIG. 2 shows PC board 1 and connector assembly 3 with a filter adaptor 6 in place. The filter adaptor 6 was inserted by first removing leads 4 and 5 from connector 3. Adaptor 6 is then plugged into the connector 3 and leads 4 and 5 are inserted into adaptor 6 in the same positions they occupied on the connector.

FIG. 3 shows an enlarged view of the filter adaptor 6. The body 22 of the adaptor 6 is made of insulating material such as phenolic. Filter 7 is made in the form of an extruded ferrite tube covered with an insulating material having a high dielectric constant such as barium titanate compound. Generally, a filter having the properties of the type described in application Ser. No. 883,501 filed on Dec. 8, 1969 is contemplated. The outer and inner surfaces are covered with conductive coatings which are insulated from each other. Thus, a high capacity exists between these two surfaces. In addition, there are magnetic losses produced by the ferrite on high frequency currents passing through the filter. The result is a filter which greatly attenuates high frequency RF energy.

The inner conductor of filter 7 is connected to spring contact 9 and also to the upper surface of a dual flat sided contactor 13 which consists of a thin strip of insulation such as fiber glass with copper laminate on top and bottom. The bottom surface of contactor 13 connects to spring contact 10 and also to ground strap 18. Spring contacts 9 and 10 plug into the connector 3.

Ground strap 18 is made of a conducting spring material suitably plated. It provides peripheral contact to the outer surface of filter 7 by means of spring tines 8 which encircle the filter.

The filter 7 is thus connected between spring contacts 9 and 10 and also between the upper and lower conducting surfaces of dual contactor 13 at points 12 and 11 respectively.

The lead wires 4 and 5 which terminate in spring contacts similar to 9 and 10 plug into openings 16 and 17 of the adaptor and are guided by members 14 and 15 of the phenolic housing so as to contact the upper and lower surfaces of dual contactor 13. The original electrical circuits between leads 4 and 5 and the PC board connector are thus maintained with the addition of a low-pass interference filter inserted between these two circuits.

With the filter 7 attached to spring contact 9 it becomes unnecessary to use a locking clip which would otherwise be used in slot 24 to hold a spring contact of this type in place. Sufficient friction from the filter holds the adaptor in place. However, when it is desired to remove the adaptor from the PC board connector it may be pulled off by hand, without resort to any tools.

It is evident that the entire operation of inserting the filter adaptor can be performed in a few moments, thus enabling the equipment designer to quickly determine the effectiveness of the RF filter in the circuit under test.

The above described a filter adaptor which not only provides a useful tool for testing the effectiveness of RF filtering but which can also be used wherever interim or emergency RF filtering is required.

While various embodiments of the invention have been shown and described, it will be understood that various modifications may be made. The appended claims are, therefore, intended to define the true scope of the invention.

I claim:

1. A lead receiving filter adaptor for insertion into the connector assembly of a circuit board comprising:
- a body made of insulating material;
- two spring contacts extending outwardly from within said body for insertion into the connector assembly;
- a dual contactor within the body provided with a pair of contact elements insulated from each other,
- a tubular filter provided with an input terminal, an output terminal and a common terminal, with the input and output terminals respectively connected to one of said contact elements and one of said spring contacts,
- means connecting the common terminal of the filter to the other contact element and other spring contact, and
- receptacles within said body for the insertion of two leads whereby one lead will contact one contact element of said dual contactor and the second lead will contact the other contact element of said dual contactor.

2. The filter adaptor of claim 1 wherein said means connecting the common terminal includes a ground strap which provides peripheral contact to the outer surface of said filter constituting the common terminal.

3. The filter adapter of claim 1 wherein said tubular filter comprises a ferrite tube coated with a dielectric material.

4. The filter adaptor of claim 3 wherein said dielectric material is a barium titanate compound.

5. The filter adaptor of claim 1 wherein said dual contactor comprises a thin strip of insulation with copper laminate surfaces forming the contact elements.

6. The filter adaptor of claim 1 wherein said housing is made of phenolic composition.

7. The filter adaptor of claim 1 wherein said receptacles contain spring contacts into which said leads terminate.

8. A filter adaptor for insertion in a circuit between a connector assembly of a circuit board and leads passing to other components comprising:
- a first pair of spring contacts for making contact with the connector assembly;
- a low pass filter provided with a plurality of terminals with a pair of such terminals connected between said spring contacts;
- a contactor of insulating material having two separate conductive surfaces, one said surface being connected to another terminal of said low pass filter and the other said surface being connected to one of said pair of terminals of the filter;
- an adaptor body encasing said contactor having recepacles adjacent to said contacting surfaces for respectively receiving two leads; and
- securing means for holding said leads in conductive communication with respective said conductive surfaces of said contactor.

* * * * *